March 5, 1929.　　　C. BREER　　　1,704,279

DRIVE CHAIN

Filed April 21, 1924

Inventor
Carl Breer
By M. Lord
Attorney

Patented Mar. 5, 1929.

1,704,279

UNITED STATES PATENT OFFICE.

CARL BREER, OF DETROIT, MICHIGAN, ASSIGNOR TO CHRYSLER CORPORATION, OF HIGHLAND PARK, MICHIGAN, A CORPORATION OF DELAWARE.

DRIVE CHAIN.

Application filed April 21, 1924. Serial No. 707,871.

Drive chains have a tendency to lash in a periodic manner thus making the joint noisy and increasing the wear on the chain. This is particularly noticeable in chains used with timing gears of automobiles. The present invention is designed to obviate this tendency to lash by the introduction of friction between the links.

The invention is illustrated in the accompanying drawings as follows:—

Figure 1:
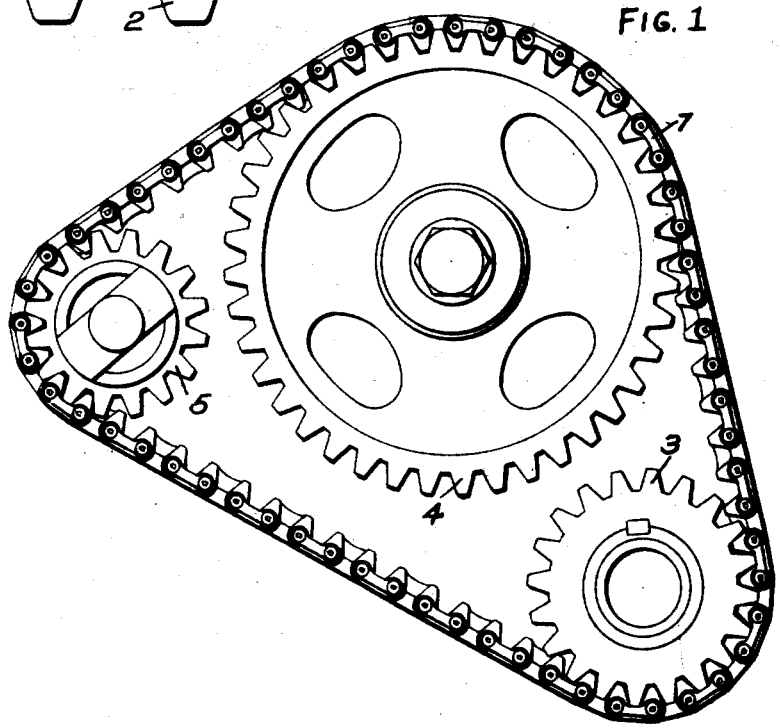

Fig. 1 shows a side elevation of the chain.

Figure 2:
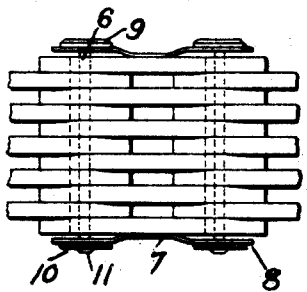

Fig. 2 an enlarged plan view of a fragment of the chain.

Figure 3:
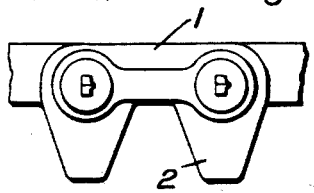

Fig. 3 an enlarged side elevation of a fragment of the chain.

1 marks the chain links. These are provided with driving teeth 2 which operate on the timing gears 3, 4 and 5.

The links are connected by pins 6, the links being formed in sets and the pins forming the usual connections between the sets of links. Spring links 7 are mounted on the pins, these links having the outwardly deflected ends 8 arranged under the heads 9 of the pins at one side of the chain and under caps 10 at the opposite end of the chain, the caps being secured in the usual manner by the heading over at 11 of the pins.

The springs are put under tension in order to draw them to the position shown in the drawings, having a much greater normal deflection than shown. In consequence the links are pressed together creating sufficient friction to obviate in a large measure the tendency of the reaches of the drive chain to lash, the friction dampening the periodic response of the chain to driving conditions. On the other hand the friction is not enough to interfere with the flexibility to prevent the efficient operation of the chain. By making the spring links of a pre-determined strength they readily lend themselves to creating just sufficient friction to prevent lashing and the amount necessary in each case being readily determinable by experiment.

What I claim as new is:—

1. In a drive chain, the combination of a series of sets of links; headed pins connecting the sets of links; and spring links secured on the pins under the heads, said spring links being under tension and crowding the links together at the joints for creating friction to obviate chain lash, said spring links extending between the same pins and being stationary relatively to the links directly engaged by the spring links.

2. In a chain, the combination of a series of sets of links; headed pins connecting the sets of links; and spring links arranged at each side of the chain under the heads of the pins pressing the links together at the joints for creating friction to obviate chain lash, said spring links extending between the same pins and being stationary relatively to the links directly engaged by the spring links.

In testimony whereof I have hereunto set my hand.

CARL BREER.